March 21, 1961  G. A. LYON  2,975,744
METHOD OF AND MEANS FOR MAKING WHEEL COVERS
Filed Feb. 17, 1956  2 Sheets-Sheet 2
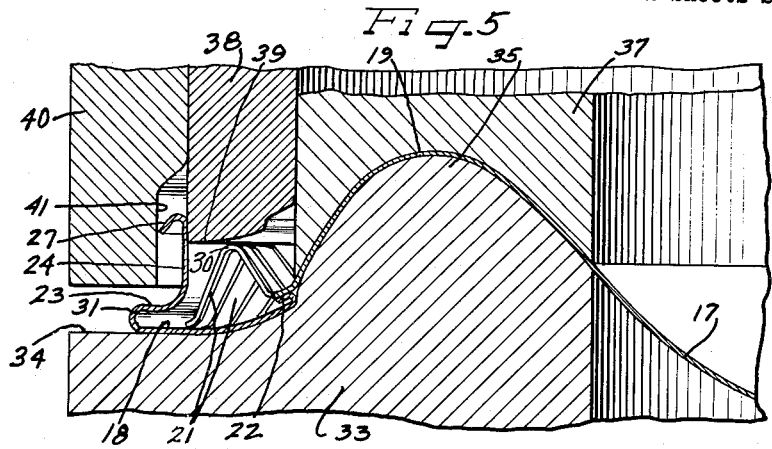
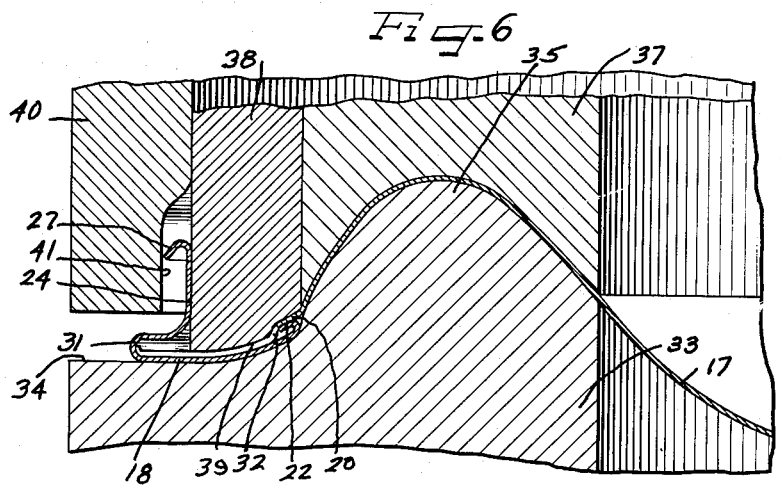
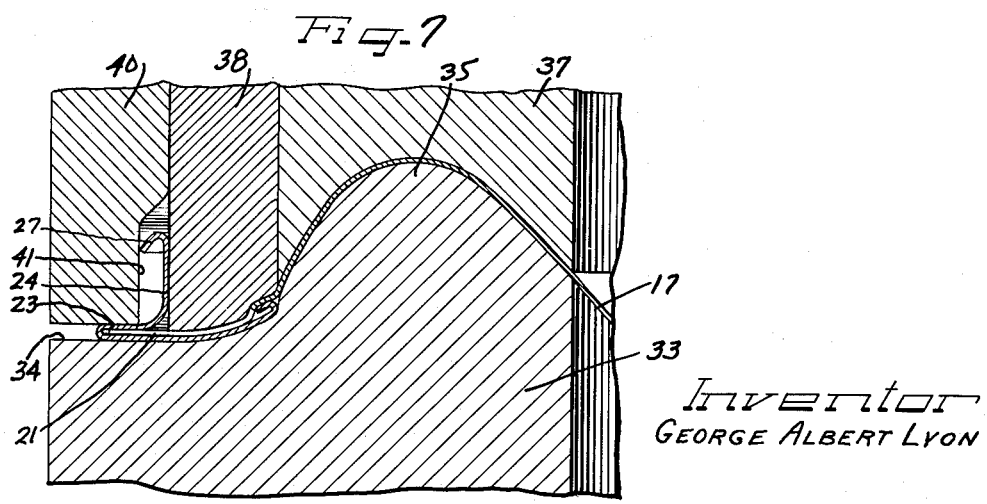
Inventor
GEORGE ALBERT LYON

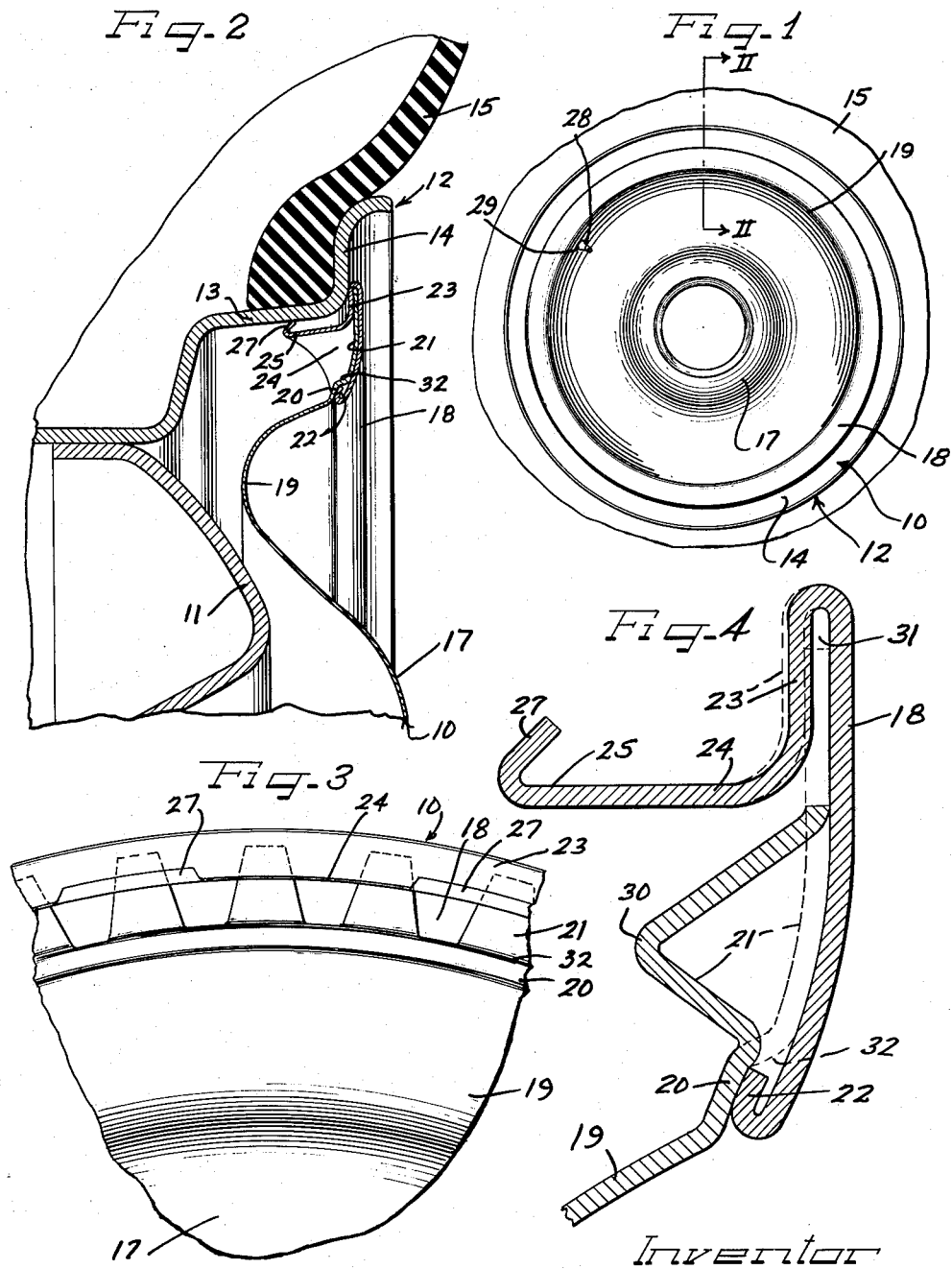

United States Patent Office 2,975,744
Patented Mar. 21, 1961

2,975,744

METHOD OF AND MEANS FOR MAKING WHEEL COVERS

George Albert Lyon, 13881 W. Chicago Blvd., Detroit 28, Mich.

Filed Feb. 17, 1956, Ser. No. 566,229

4 Claims. (Cl. 113—116)

The present invention relates to improvements in a method of making wheel covers.

Certain materials such as sheet aluminum lend themselves well to novel ornamental effects in a wheel cover but, on the other hand, may be too soft, in at least certain grades thereof, to secure sufficient resilience or stiffness therein for retaining interengagement with a wheel. For example, anodized aluminum, or otherwise surface treated aluminum affords desirable colors in a selection of shades of which it may be desirable to provide in wheel covers consonant with or in contrast to the finish color or combinations of color of vehicles such as automobiles. Yet it is desirable that the covers be readily applicable to the vehicle wheels by press-on, pry-off retaining means which to be most effective should comprise a work hardenable material of better work hardenable characteristics than aluminum. Such a material may be stainless steel or brass, by way of example.

The principal aim of the present invention is to provide a method of making combination wheel cover construction affording the decorative advantages of a colorable material such as aluminum and the cover retaining advantages of a work hardenable material such as stainless steel or brass.

Another object of the invention is to provide a novel method of uniting components of a composite wheel cover structure.

A further object of the invention is to provide a novel method of making composite wheel covers.

Other objects, features and advantages of the present invention will be readily apparent from the following detailed description of certain preferred embodiments thereof taken in conjunction with the accompanying drawings in which:

Figure 1 is an outer side elevational view of a vehicle wheel structure embodying features of the invention;

Figure 2 is a fragmentary radial sectional detail view taken substantially on the line II—II of Figure 1 and on an enlarged scale;

Figure 3 is a fragmentary rear elevational view of the cover of Figures 1 and 2;

Figure 4 is an enlarged schematic detail sectional view of the components of the cover illustrating a method of assembling the same;

Figure 5 is a fragmentary vertical sectional detail view through a die assembly for securing components of the cover together and showing the elements of the die assembly in one preliminary relative operational relationship;

Figure 6 is a sectional detail view similar to Figure 5 but showing the components of the die assembly in a further operational relationship; and Figure 7 is a similar sectional view showing the components of the die assembly in the final stage or relationship wherein assembly of the cover components has been completed.

A wheel cover 10 (Figs. 1, 2 and 3) embodying features of the invention is constructed and arranged for disposition in ornamental and protective relation at the outer side of a vehicle wheel including a wheel body 11 and a tire rim 12 supported thereby and including an intermediate generally radially inwardly facing annular axially outwardly directed flange 13 merging with a terminal flange 14 and constructed and arranged to support a pneumatic tire 15.

According to the present invention, the wheel cover 10 includes a generally circular body member 17 and a circular supporting and cover retaining ring member 18. The two cover members or components are secured together in a composite, permanent assembly and are adapted for ready press-on, pry-off disposition at the outer side of the wheel. The circular cover member 17 may be made from a material of ornamental characteristic such as aluminum that has been anodized or otherwise appropriately colored, while the supporting and retaining ring 18 may be made from suitable stainless steel or brass. Although the cover member 17 may be a ring to cooperate with a central hub cap, in the present instance it is in the form of a disk dimensioned to overlie the wheel body 11 and to substantially overlie the tire rim 12.

The circular cover body 17 may be stamped or drawn to shape, with a central crown portion merging into an intermediate annular dished portion 19 leading at its radially outer side into a stepped annular marginal flange portion 20 from which project a series of radially extending circumferentially spaced interlock tabs or fingers or flange extensions 21 which interengage with the ring member 28, which overlies the same concealingly.

Herein, the ring member 18 is of a diameter to overlie the tire rim and more particularly the intermediate flange 13 thereof, having an inner underturned reinforcing and finishing flange 22 which in the assembly is arranged to seat snugly against the ledge or step provided by the marginal cover flange 20. At its radially outer margin the ring member 18 is provided with an underturned annular flange 23 between which and the body of the member 18 the radially outer end portions of the interlock extensions 21 are clamped. In addition the underturned flange 23 affords a seat bottoming against the radially inner portion of the terminal flange 14 of the wheel rim.

Furthermore, the underturned flange 23 is provided with cover retaining means which may be substantially like the cover retaining means disclosed in my U.S. Patent 2,624,634, dated January 6, 1953. To this end, the underturned flange 23 is provided with an axially inwardly directed continuous annular flange extension 24 of a diameter to fit in freely spaced relation telescopically within the axially outer portion of the intermediate flange 13 of the tire rim. From the axial flange 24 extends a suitable series such as 8 to 16 cover retaining fingers 25 each provided with a short and stiff generally radially and axially outwardly oblique retaining terminal 27 which is engageable in retaining gripping edgewise relation with the intermediate flange 13 under resilient tension thrust imparted by the retaining fingers 25 and the axial flange 24 coacting for this purpose.

For applying the cover 10 to the outer side of the wheel, a valve stem 28 is registered through a suitable valve stem opening 29 in the intermediate dished portion 19 of the cover body and the cover is then pressed axially inwardly to engage the retaining fingers 25 with the tire rim until the underturned marginal flange 23 seats against the tire rim. For removing the cover from the wheel, a pry-off tool may be applied behind the reinforced marginal flange 23 of the ring member 18 and pry-off leverage applied to disengage the retaining fingers 25 from the tire rim.

In a desirable construction, the ring member 18 of the cover assembly may be made as a rolled section from suitable strip stock such as stainless steel or brass.

For effecting assembly of the cover body member 17 with the ring member 18, after the ring member 18 has been preformed the method generally depicted in Figure 4 may be employed. According to such method, the interlock flange extensions 21 are initially bent intermediately along a transverse bend line 30 into generally V-shape to provide a generally radially and axially inwardly hunched shape whereby to draw the tips of the flange extensions to a diameter slightly smaller than the inside diameter of the ring flange 24 so as to enable bringing the cover components into assembled relationship by relative axial assembly movement into the relationship as shown in full outline in Figure 4. In such preliminary assembled relationship, the underturned inner marginal flange 22 of the ring member 18 seats upon the shoulder ledge flange 20 of the cover body member, and the tips of the drawn up marginal flange extensions 21 are disposed opposite the mouth of an annular radially inwardly opening socket recess 31 defined between the return bent flange 23 and the outer marginal portion of the ring member 18. By preference, the width of the socket groove 21 is slightly less than the thickness of the material of the retaining finger flanges 21.

Then, using the inner face of the ring member 18 as an abutment and guide, pressure in an axially outward direction may be applied to the knee-like bends 30 of the interlock flanges 21 to straighten the same out and thereby cause the distal end portions thereof to enter into and drive axially outwardly into the socket groove 31, thereby causing the flange 23 to expand resiliently slightly as indicated schematically in dash outline in Figure 4 to accommodate the interlock retaining fingers and also to engage the same with a strong gripping clamping action. At the completion of the assembly pressing of the retaining flange extensions 21, they are preferably bottomed against the interface of the ring member 18.

A substantially concentric relationship is assured by pressing the juncture portions of the interlock fingers 21 with the flange 20 into locking shoulders 32 coactive with the edge of the underturned inner marginal flange 22.

Interlocking of the retaining interlock finger flanges 21 with the supporting and retaining ring 18 may be effected in die apparatus substantially as depicted in Figures 5 through 7. In such die a supporting die member 33 may be supported on the anvil of a press and has an annular seating recess 34 upon which the ring member 18 is adapted to rest in inverted position. Radially inwardly from the receiving seat 34, the supporting die member 33 has an annular ridge 35 conformed to receive snugly thereover the inverted annular intermediate dished portion 19 of the cover member 17, with the annular stepped flange 20 substantially bottoming on the turned flange 22 at the radially inner margin of the ring member 18. In this relationship the drawn up retaining flange extensions 21 are in position to be driven into the radially inwardly opening socket groove 31 of the ring member.

An upper die assembly which is adapted to be supported by a suitable ram structure of a die press includes a hold down ring 37 engageable over the die ridge 35 to clamp the cover portion 19 thereagainst and to hold the cover portion 19 against shifting or buckling incident to pressing of the retaining extension flanges 21 by means of a reciprocable ring die member 38 which is preferably operable following clamping action of the hold down die member 37. On its lower face the push down or pressure die ring member 38 is preferably contoured so as not only to substantially straighten out the connecting flange extensions 21 but also to iron the same as nearly as practicable flush against the opposing face of the ring member 18, and to shape the shoulder 32 incident to such ironing operation (Fig. 6).

Although the ring member socket grooves 31 may be, as described in connection with Figure 4, slightly undersize in width so as to receive the tip end portions of the interlock flanges 21 with a tight press fit, alternatively the socket groove may be oversize in width as shown in Figs. 5 and 6, whereby to receive the tip end portions of the interlock flanges 21 freely as they are radially outwardly projected incident to straightening out of the flange extensions as by means of the die ring member 38. Where the oversize socket groove is preferred, a closing or compressing die ring member 40 may be provided which is operable sequentially following the pressing action of the die ring 38, as shown in Figure 7 to collapse the reverse bent flange 23 tightly into clamping relation to the opposing end portions of the interlock flange extensions 21.

For retaining the axial finger flange 24 and the retaining fingers 25 against distortion incident to the squeezing down or collapsing of the flange 23, the radially outer periphery of the pressed down ring die 38 provides a cylindrical back up surface for the axial flange 24 and the fingers. In addition, the radially inner lower marginal portion of the collapsing die 40 is provided with an annular clearance groove 41 within which the retaining finger terminals 27 are accommodated and restrained against any tendency to buckle, twist or shift radially outwardly during the groove socket closing pressing operation.

Following completion of the pressing operation, the ring die members 40 and 38 are backed off clear from the cover while the hold down die member 37 serves as a hold down or stripper, and then the hold down member 37 is backed off so that the cover assembly can be removed from the die member 33 and a succeeding assembly to be secured together assembled thereon.

It will be understood that modifications and variations may be effected without departing from the scope of the novel concepts of the present invention.

I claim as my invention:

1. In a method of making wheel covers, shaping a ring member to provide a body and a return bent resilient flange affording a generally radially opening annular socket groove of predetermined limited width, forming a cover body member with a marginal series of tabs of predetermined extended length and a thickness slightly greater than said socket groove width, bending said tabs transversely to predetermined smaller tip diameter than said extended diameter so as to be disposable adjacent to the mouth of said socket groove, assembling the members to locate the drawn up ends of the tabs adjacent to the mouth of said socket groove, and then substantially straightening said tabs and driving the same into said extended length and forcing the distal end portions of the tabs into said socket groove and thereby causing said flange to expand slightly until the straightened tabs have been forced into press fit gripped relation into said socket groove.

2. In a method of assembling preformed members of sheet material, providing an annular member having along one margin a turned flange structure providing with one face of the annular member a generally radially opening groove and adjacent to the opposite margin a structure providing a shoulder spaced substantially from but facing toward said groove, providing a circular member with a circumferentially spaced series of tabs of an overall length to extend to a diameter short of the base of said groove in concentric assembly of the members but with the tabs bent up to afford a clearance relation of the tips of the tabs relative to said marginal turned flange in the initial assembly of the members, assembling the members concentrically with said bent up tabs overlying said one face of the annular member and with the tips of the tabs adjacent to the mouth of said groove, pressing the tabs against said face of the annular member and straightening the tabs and driving the tip portions of the tabs into interengaged relation within said groove, and interlocking the members concentrically by bending portions of the circular member into interlocking relation with said shoulder structure, whereby the members are maintained concentrically in assembly with the tips of the tabs extending short of the bottom of the groove.

3. The method of claim 2 wherein said turned flange structure is spaced from the face of the annular member less than the thickness of the tabs, and the tabs are forced in press fit relation into the groove and gripped by the turned flange structure and the opposing portion of the annular member face.

4. The method of claim 2 wherein the width of the groove is initially greater than the thickness of the tabs and said turned flange structure is pressed into engagement with the tip end portions of the tabs after the tabs have been inserted in the groove.

References Cited in the file of this patent
UNITED STATES PATENTS

| | | |
|---|---|---|
| 1,851,938 | Rieke | Mar. 29, 1932 |
| 2,162,734 | Lyon | June 20, 1939 |
| 2,323,914 | Jordan et al. | July 13, 1943 |
| 2,386,223 | Lyon | Oct. 9, 1945 |
| 2,493,001 | Lyon | Jan. 3, 1950 |
| 2,624,638 | Lyon | Jan. 6, 1953 |
| 2,657,099 | Judd | Oct. 27, 1953 |
| 2,671,490 | Jansen | Mar. 9, 1954 |
| 2,762,538 | Nyden | Sept. 11, 1956 |